Oct. 12, 1926.   1,602,862
C. SCHENCK
MACHINE FOR FORMING WHEEL SHAPES
Filed March 7, 1923   5 Sheets-Sheet 1

INVENTOR
Charles Schenck
BY
Clarence Kerr
ATTORNEYS

Oct. 12, 1926. 1,602,862

C. SCHENCK
MACHINE FOR FORMING WHEEL SHAPES
Filed March 7, 1923 5 Sheets-Sheet 2

INVENTOR
Charles Schenck
BY
Clarence Spurr
ATTORNEYS

Oct. 12, 1926.  1,602,862
C. SCHENCK
MACHINE FOR FORMING WHEEL SHAPES
Filed March 7, 1923  5 Sheets-Sheet 5
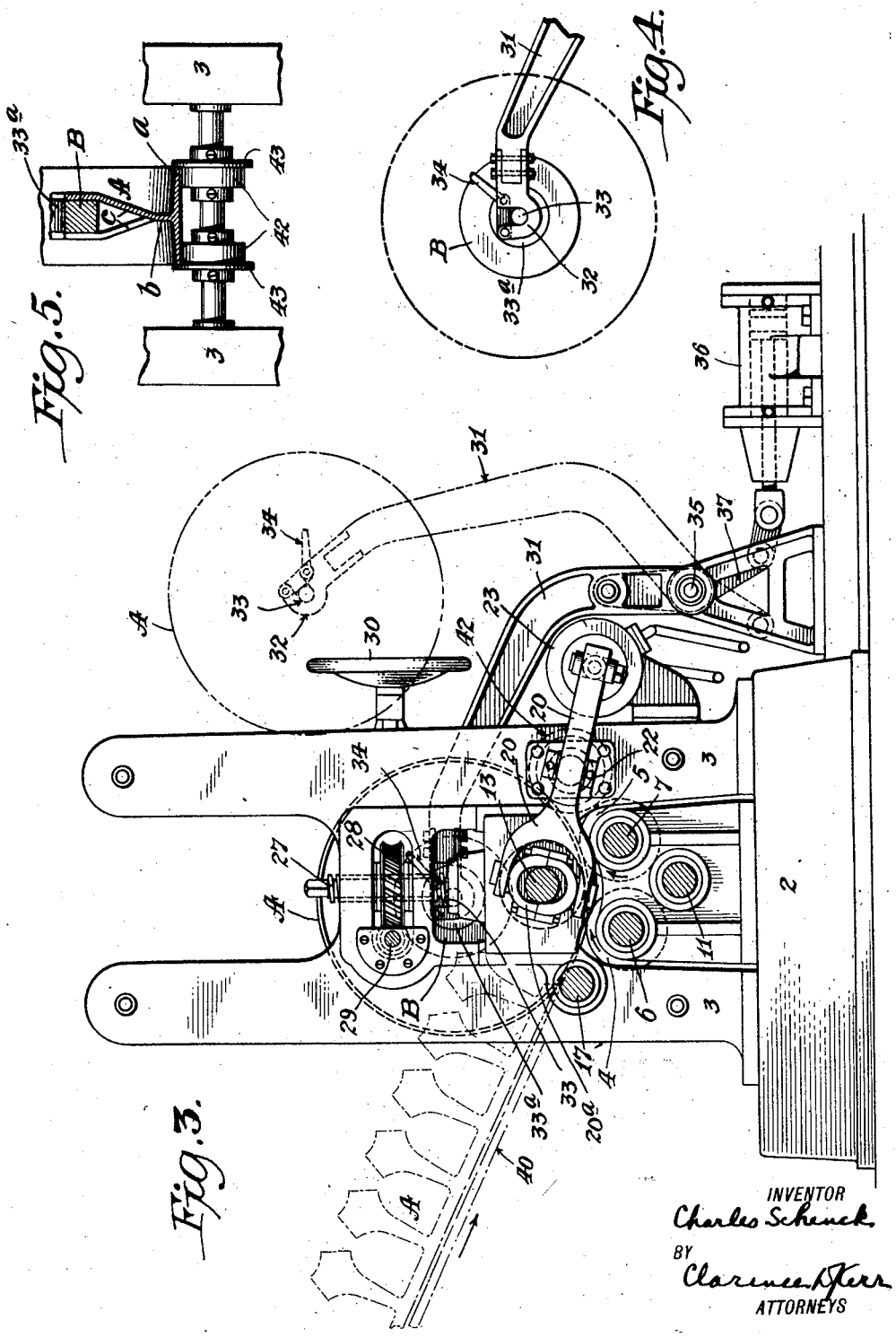
INVENTOR
Charles Schenck
BY
Clarence A Kerr
ATTORNEYS Oct. 12, 1926.

C. SCHENCK 1,602,862

MACHINE FOR FORMING WHEEL SHAPES

Filed March 7, 1923     5 Sheets-Sheet 4

INVENTOR
Charles Schenck,

BY
Clarence Kerr
ATTORNEY

Oct. 12, 1926.
C. SCHENCK
1,602,862
MACHINE FOR FORMING WHEEL SHAPES
Filed March 7, 1923   5 Sheets-Sheet 5
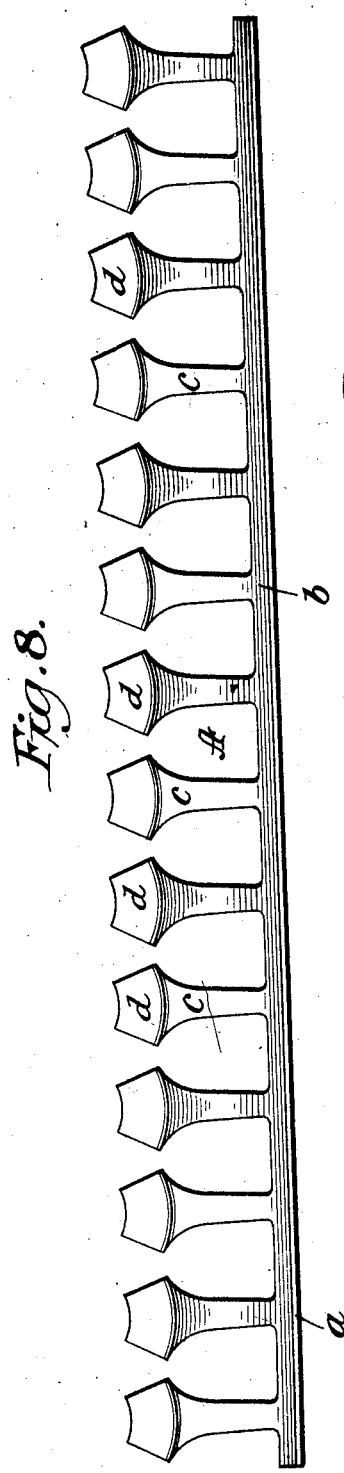
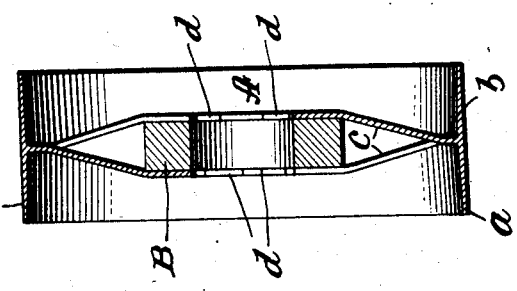
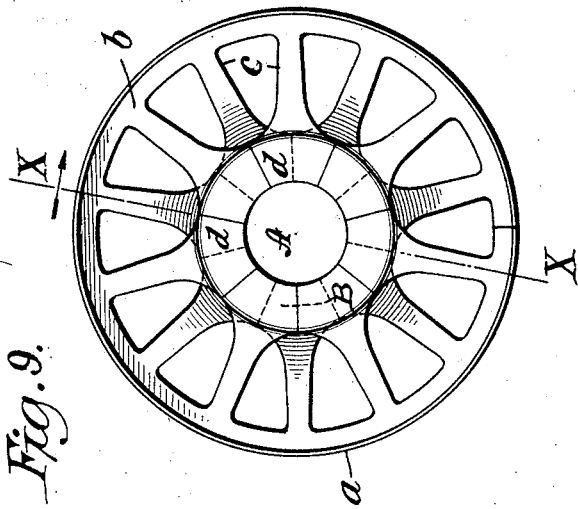
INVENTOR
Charles Schenck,
BY
Clarence D Kerr
ATTORNEYS Patented Oct. 12, 1926.

1,602,862

UNITED STATES PATENT OFFICE.

CHARLES SCHENCK, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

MACHINE FOR FORMING WHEEL SHAPES.

Application filed March 7, 1923. Serial No. 623,361.

Figure 1:
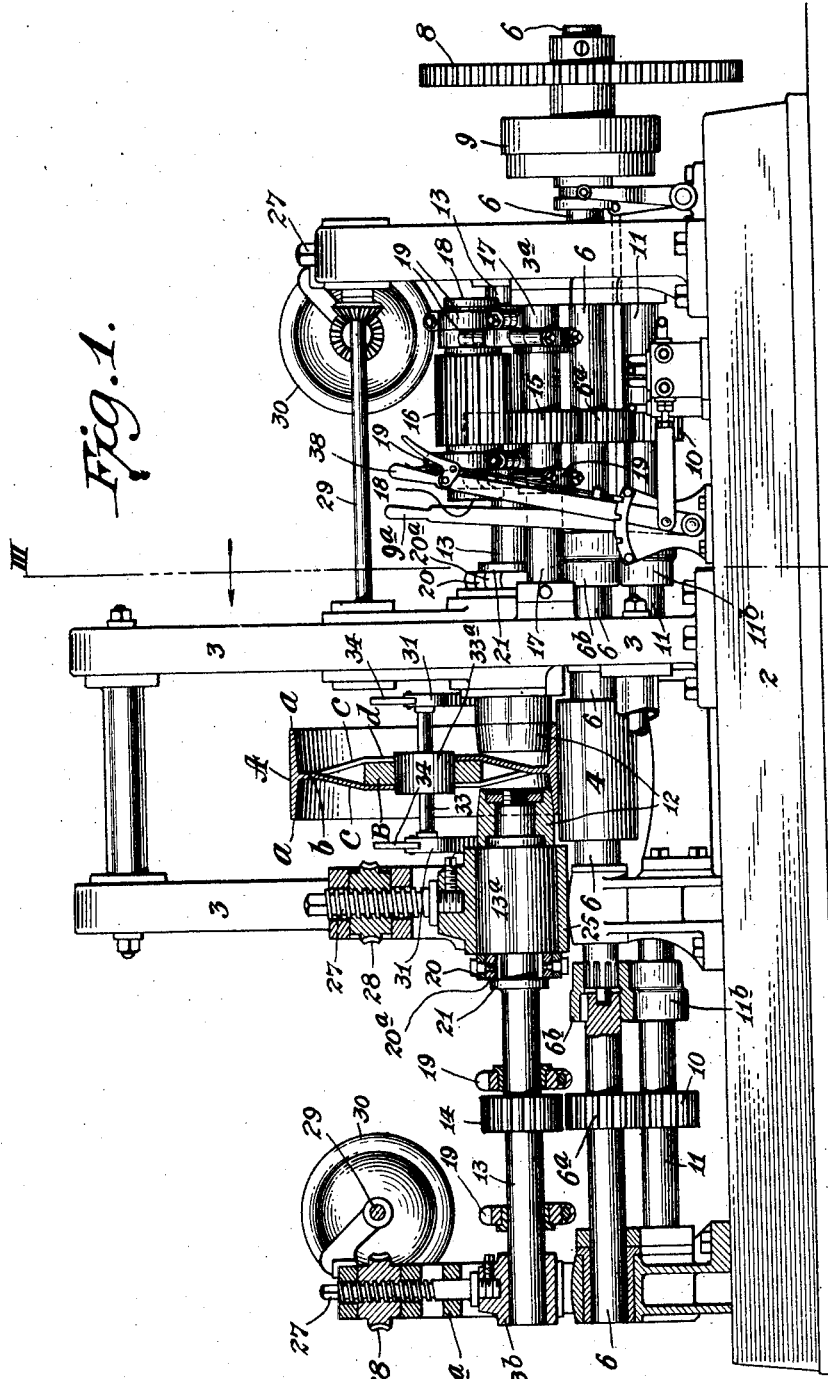
Figure 2:
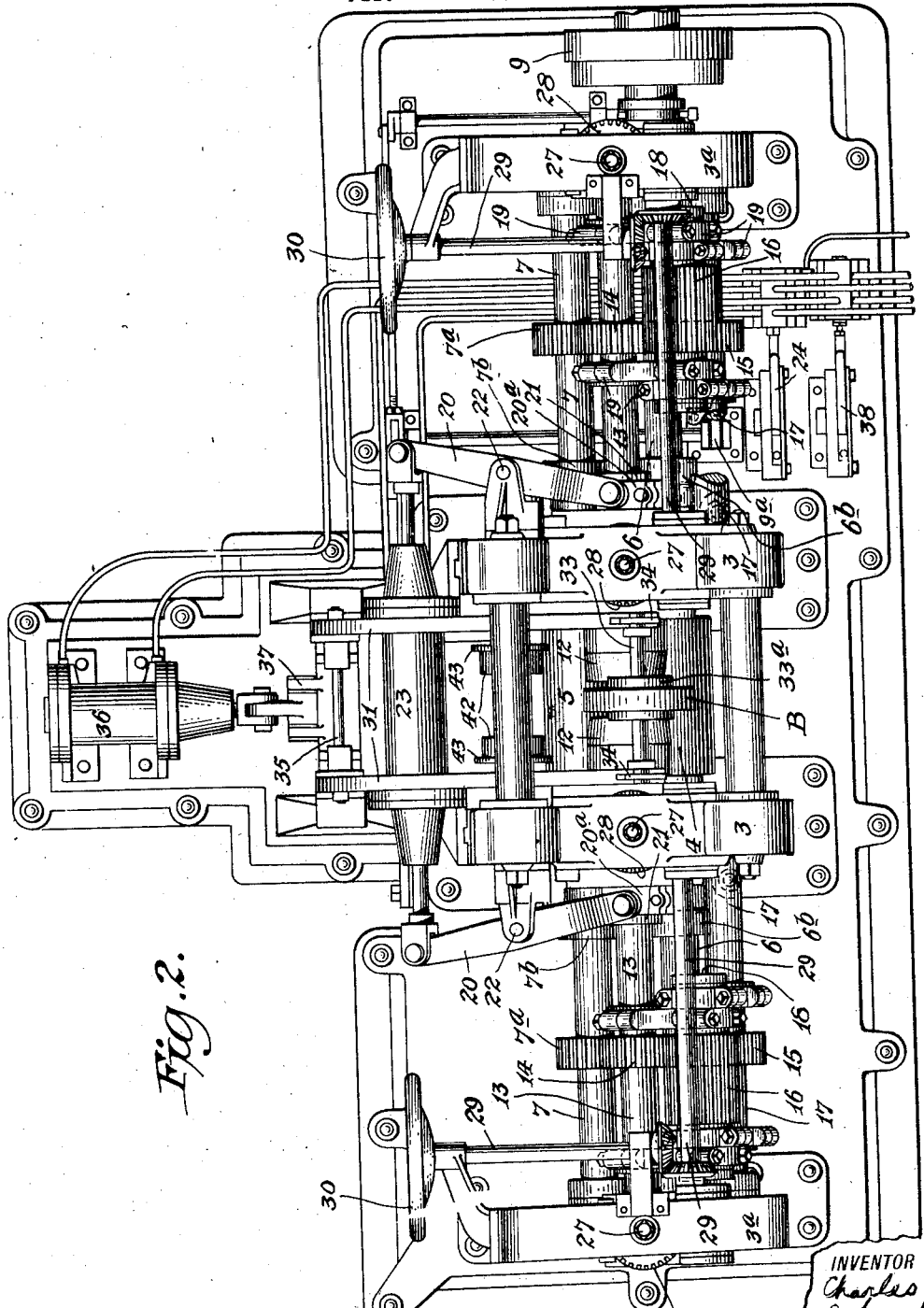
Figure 6:
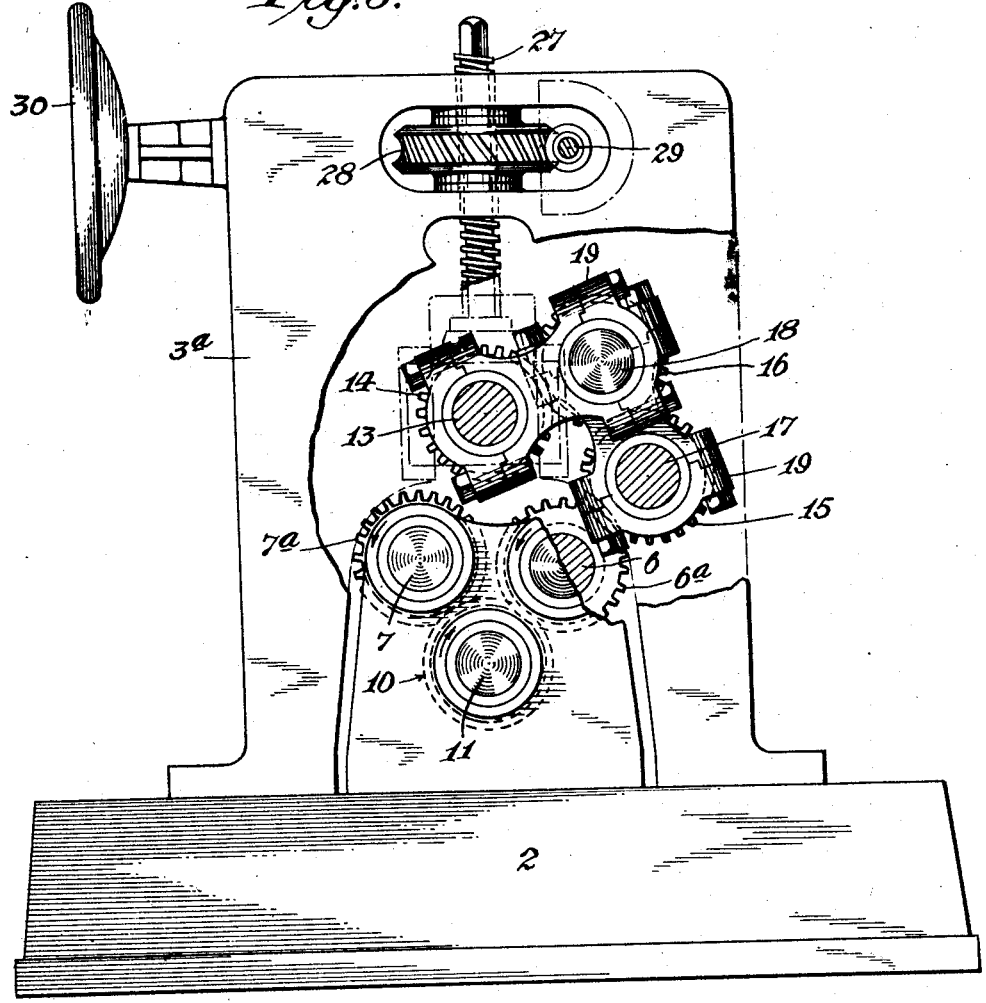
Figure 7:
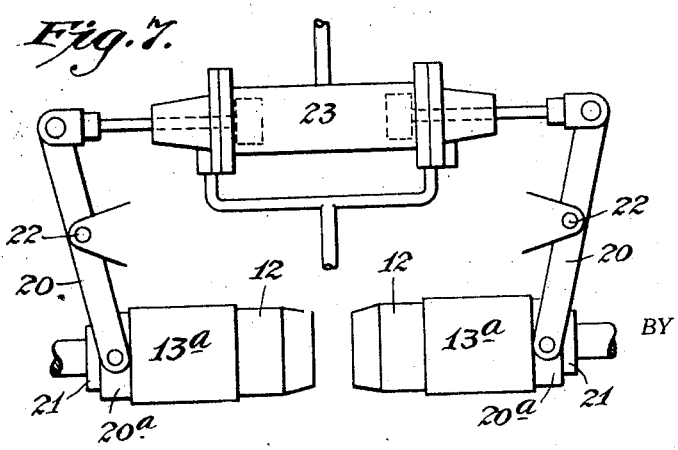

Figure 1 is a front elevation, partly in section, of a machine embodying my invention; Fig. 2 is a plan thereof; Fig. 3 is a section on lines III—III of Fig. 1; Fig. 4 is a detail of the spacer support and ejector; Fig. 5 is a detail of the guiding rolls; Fig. 6 is an end elevation of the end housing on the left-hand end of the machine, partly broken away; Fig. 7 is a diagram of the divided upper rolls and the mechanism for moving the rolls into and out of operative position; Fig. 8 is an elevation of a wheel blank before passing through the machine; Fig. 9 is an elevation of the blank after being shaped by the machine; and Fig. 10 is a section on lines X—X of Fig. 9.

My invention relates to machines for forming wheel shapes from flanged beams or sheets, particularly of the type shown in application Serial No. 389,754 of Charles Schenck, Lewis Fine and Emil Ibach, filed June 17, 1920, (Patent No. 1,552,573, dated Sept. 8, 1925), and comprises a machine in which a flanged beam or sheet with integral spoke portions extending substantially at right angles thereto is rolled or formed into a complete and symmetrical wheel shape with the straight portion forming the rim and the spoke portions extending inwardly along radii of the hub portion of the shape, and a spoke spacing member or separator is incorporated in the shape during the forming operation. My invention also comprises the various features which I shall hereinafter describe and claim.

Referring to the drawings, A indicates a wheel blank having flanges $a$, a web $b$ and alternately bent spokes $c$ having ends $d$ of keystone shape, and the spoke spacer or separator is indicated as B. The machine has a bed plate 2 and a housing 3. The driven rolls 4 and 5 are mounted on the shafts 6 and 7, which are supported by the housing 3 as well as by the end housing $3^a$. The shaft 6 is driven from a suitable source of power—for instance, the driven gear 8, to which it is connected by the clutch 9 operated by the hand lever $9^a$. The shafts 6 and 7 have on either side the main housing 3 gears $6^a$ and $7^a$ secured thereto, and meshing with each pair of gears $6^a$ and $7^a$ is a pinion 10 mounted on an idler shaft 11, so that when the shaft 6 is driven its roll 4 will rotate with it and at the same time will drive the roll 5 in the same direction through the idler pinion 10. The shafts 6, 7 and 11 are severable on either side the main housing 3 at $6^b$, $7^b$ and $11^b$, and the end housing $3^a$ may be detached from the base 2 so as to permit repairs or renewals without disturbing the main housing 3 or rolls and the portions of the shafts mounted therein.

The machine has also positively driven rolls 12, which with the rolls 4 and 5 form the blank into wheel shape by engaging the upper side of the flange of the blank, as will later be described. The rolls 12 comprise a divided roll, or, in reality, two rolls rotating on the same axis, each part of which is secured on the end of a shaft 13. The ends of the rolls 12 are bevelled to correspond to the bevelled upper face of the flanges $a$ of the wheel blanks, and rolls of varying diameter having faces bevelled at various pitches may be used, depending on the size and character of the wheel blank to be shaped. The shafts 13 are supported in bearings $13^a$ and $13^b$ in the housings 3 and $3^a$. The bearing $13^a$ is elongated and of a diameter equal to the largest diameter of the roll 12, so as to permit the retraction of the roll 12 through the sleeve 25 in which the bearing $13^a$ is mounted. The shaft 13 is driven through its gear 14, from the gear $6^a$ on the shaft 6 through the gears 15 and 16 mounted on the shafts 17 and 18. The shaft 17 is mounted in bearings in the housings 3 and $3^a$, while the stub shaft 18 is carried in brackets 19 supported by the shafts 13 and 17.

The parts of the rolls 12 are arranged for movement along its axis and to be advanced or retracted into engagement with or from the upper faces of the flange $a$ of the work piece A, and also to be raised and lowered independently to provide adjustment for variations in sizes and thickness of the blank to be operated upon. The means for moving each of the rolls 12 along its axis into and out of engagement with the blank is best shown in Figs. 2 and 7, and comprises a lever 20 having a collar $20^a$ engaging a shoulder 21 on the shaft 13, fulcrumed at 22 on the housing and actuated by a suitable source of power such as a hydraulic cylinder 23, which I have shown of the opposed double piston type and actuating both roll units 12. The operation of the cylinder 23 and the rolls 12 is controlled by the hand lever 24. To permit the rotation of the roll units 12 in the various positions which they may occupy, the gear 16 has a face double the length of the gear 14 on the shaft 13 which it engages, so that whether advanced or retracted these gears will remain in engagement. To vary the distance from the faces of the rolls 12 to the faces of the rolls 4 and 5 separate sets of elevating mechanisms are employed, which are operated independently of each other. These mechanisms consist in the sleeves 25 and 13$^b$, in which shafts 13 are mounted, and which are raised and lowered in guides in the housings 3 and 3$^a$ by vertical elevating screws 27 operated by the worm gears 28 connected by the shafts 29 and actuated by the hand wheels 30.

The mechanism for supporting the spacer B and ejecting the wheel A is in the rear of the machine and consists in two curved lever arms 31 terminating at their forward ends in open bearings 32, which supports the ends of a shaft 33 having an enlargement or false hub 33$^a$ upon which a spoke spacing member B is carried. The shaft 33 is held in position in the bearings 32 by the locking dogs 34. The levers 31 are pivoted at 35 and are actuated by any suitable means such as the hydraulic cylinder 36, which is connected to a single lever arm extension 37, which is rigid with the levers 31. The cylinder is operated by means of the hand lever 38 which controls the fluid supply therefor.

A feed table 40, arranged tangent to an arc struck from the axis of the shaft 33, projects from the front of the machine, as is shown in Fig. 3, so that the blank, as it is fed into the machine, enters the pass between the rolls 4 and 5 on the lower side and the divided rolls 12 on the upper side.

At the rear side of the machine are the idler flanged guide rolls 42 which bear on the outer and side edges of the rim portion of the blank after it has passed through and been bent into an arc by the rolls 4, 5 and 12, as is shown in Fig. 5.

The operation of my machine is as follows: At the beginning of a run of wheels of a particular size and weight of metal the operator adjusts the axis of the rolls 12 the proper distance above the axes of the rolls 4 and 5. With the spacer support 33 in the position shown in full lines in Figs. 1, 2 and 3, a wheel blank (preferably with its forward end bent upwardly to a slight extent to prevent it from butting against the roll 5) is then fed down the chute 40, until its end rests on the rolls 4 and 5. The operator then by manipulating the hand lever 24 causes the roll units 12 to advance toward each other and engage the upper faces of the flange $a$ on the work piece A, thus bearing down on and gripping the flanges $a$ of the wheel blank. The clutch 9 is then thrown in by the hand lever 9$^a$ thus connecting the shaft 6 with the source of power and setting it in motion. As the shaft 6 revolves, it not only drives the roll 4 mounted thereon, but through the gear 6$^a$, 10 and 7$^a$ drives the roll 5, and through the gears 15, 16 and 14 and shafts 13 drives the divided rolls 12 in a direction opposite to the direction of rotation of the rolls 4 and 5. The rolls 4, 5 and 12 thereupon grip the bottom and top surfaces of flanges $a$ of the blank A and feed it forwardly, forcing it down under the rolls 12 and up over the surface of the rolls 5, thus bending the successive portions of the blanks in arcs struck from the axis of the spacer supporting shaft 33. As the rolls 4, 5 and 12 continue to revolve, they feed the forward end of the blank A forward into engagement with the flanged guide rolls 42, the faces of which are tangent to the circumference of the shape being formed, and assist in holding true the successive arcs, while the side flanges 43 of the guide rolls 42 prevent the blank from twisting out of the line.

When the blank has completely passed through the rolls 4, 5 and 12, the operator, through the lever 24 and cylinder 23, retracts the rolls 12, and then, through the lever 38 and cylinder 36, rotates the levers 31 with the completely formed circular shape A upon them to the rear of the machine. The dogs 34 are then unlatched and the shaft 33 with the shape A upon it is next lifted out of the bearings 32, and another shaft 33 having a temporary hub 33$^a$ with spacer B upon it is then placed in the bearings 32. The dogs 34 then lock the shaft 33 in position, the cylinder 36 is then actuated to rotate the levers 31 into the full line positions shown in Figs. 1, 2 and 3, and the machine is then ready to operate upon a succeeding blank.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In apparatus for forming metal wheel shapes from flanged blanks with integral spokes, driven rolls engaging the exterior surface of the flanged portion of the blank, other driven rolls engaging the opposite side of the flanged portion, a support for the blank, the said rolls being arranged to drive the blank forwardly in the arc of a circle to engage the support, and means for removing the support with the formed blank upon it.

2. In apparatus for forming metal wheel shapes from flanged blanks with integral spokes, driven rolls mounted on three parallel axes having an arc-shaped passage between them arranged to engage laterally extending faces of the wheel blank and bend successive portions of the said blank through the arc-shaped passage between the said rolls, and supporting mechanism positioned in the axis of the said arc-shaped passage adapted to be engaged by the spokes of the blank and about which the shape is formed.

3. Apparatus for forming metal wheel shapes from flanged blanks with integral spokes comprising driven rolls engaging the exterior surface of the flanged portion of the blank, other driven rolls arranged on a common axis and in staggered relation to the first named rolls engaging opposite faces of the flanged portion of the blank, the space between the said rolls defining an arc of a circle of a diameter of substantially the completed wheel shape, the said rolls when driven being arranged to bend the successive portions of the blank to conform to the arc between the rolls.

4. Apparatus for forming metal wheel shapes from flanged blanks with integral spokes comprising driven rolls engaging the exterior surface of the flanged portion of the blank, other driven rolls arranged on a common axis and movable axially to engage with and be disengaged from opposite faces of the flanged portion of the blank, the said rolls having an arc-shaped passage between them and when driven being arranged to bend successive portions of the blank to conform to an arc of a circle.

5. Apparatus for forming metal wheel shapes from flanged metal blanks with integral spokes comprising driven rolls engaging the exterior surface of the flanged portion of the blank, other driven rolls arranged to be advanced axially to engage the faces of the flanged portion of the blank on either side of the spokes, the said rolls having an arc-shaped passage between them and being arranged to bend the blank as it passes over the first mentioned rolls, the said second mentioned rolls being retractable to permit the withdrawal of the complete shape from the machine.

6. Apparatus for forming metal wheel shapes from flanged blanks with integral spokes comprising driven rolls engaging the exterior surface of the flanged portion of the blank, other driven rolls each of which has an independent means of rotation and is mounted on a separate shaft, and means for advancing and retracting the second mentioned rolls into engagement with the faces of the blank which subsequently form the interior faces of the rim portion of the completed shape the said second mentioned rolls being interposed in the path of the blank between the first mentioned rolls and forming a fulcrum about which the blank is bent.

7. Apparatus for forming metal wheel shapes from flanged blanks with integral spokes comprising driven rolls engaging the exterior surface of the flanged portion of the blank, other driven rolls, the first mentioned rolls and the second mentioned rolls forming means for bending the blank into circular shape, fluid pressure mechanism, and levers operated by said fluid pressure mechanism for advancing and retracting the second mentioned rolls into engagement with the faces of the blank which subsequently form the interior faces of the rim portion of the completed shape.

8. Apparatus for forming metal wheel shapes from flanged blanks with integral spokes comprising driven rolls engaging the exterior surface of the flanged portion of the blank, axially aligned shafts, other driven rolls mounted on said shafts, said shafts being movable axially to bring the second mentioned rolls into and out of engagement with faces on the same side of the blank and opposite the exterior surface of the blank, the second mentioned set of rolls engaging the interior of the blank at points opposite to which it is engaged by the first mentioned rolls, and driving means for the shafts connected with said shafts during engaged and disengaged positions of said shafts.

9. Apparatus for forming metal wheel shapes from flanged blanks with integral spokes comprising driven rolls engaging the exterior surface of the flanged portion of the blank, axially aligned shafts, other driven rolls mounted on said shafts, said shafts being movable axially to bring the second mentioned rolls into and out of engagement with faces on the same side of the blank and opposite the exterior surface of the blank, driving means for the shafts connected with said shafts during engaged and disengaged positions of said shafts, the second mentioned set of rolls engaging the interior of the blank at points opposite to which it is engaged by the first mentioned rolls, and means for adjusting the position of said second mentioned rolls to compensate for blanks of varying thicknesses.

10. Apparatus for forming metal wheel shapes from flanged blanks with integral spokes comprising driven bending rolls engaging opposite faces of a blank arranged to bend the blank into circular form, a support carrying a spoke spacing member about which the blank is bent, and means for withdrawing the support and the shaped blank upon it after the blank is bent into circular form.

11. Apparatus for forming metal wheel shapes from flanged blanks with integral spokes comprising lever mechanism having forwardly extending arms, a false axle, a false hub on the axle, the axle being supported by the said arms, driven bending rolls engaging opposite faces of a blank arranged to bend the blank into circular form about the said false hub, and means connected with the rear end of the lever mechanism for withdrawing the completed shape from the machine.

12. Apparatus for forming metal wheel shapes from flanged blanks with integral spokes comprising lever mechanism having forwardly extending arms, a false axle, a false hub on the axle, the axle being supported by the said arms, driven bending rolls engaging opposite faces of a blank arranged to bend the blank into circular form about the said false hub, means connected with the rear end of the lever mechanism for withdrawing the completed shape from the machine, and latch mechanism for removably securing the axle in said lever arms.

CHARLES SCHENCK.